UNITED STATES PATENT OFFICE.

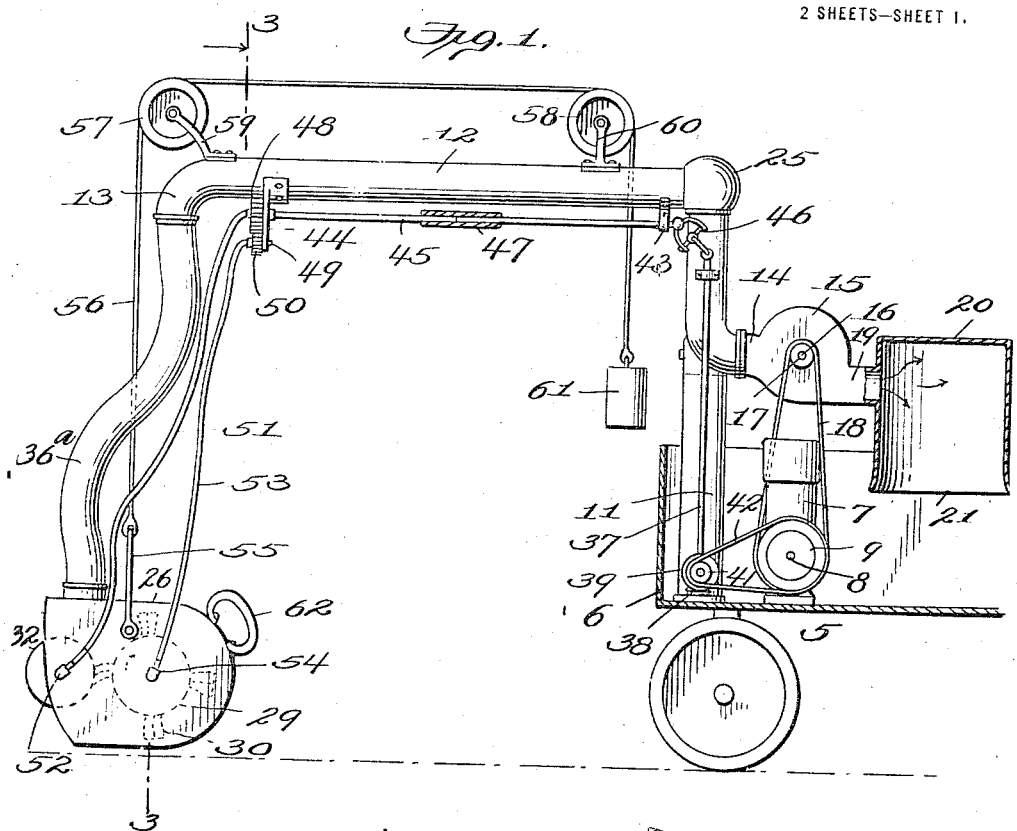
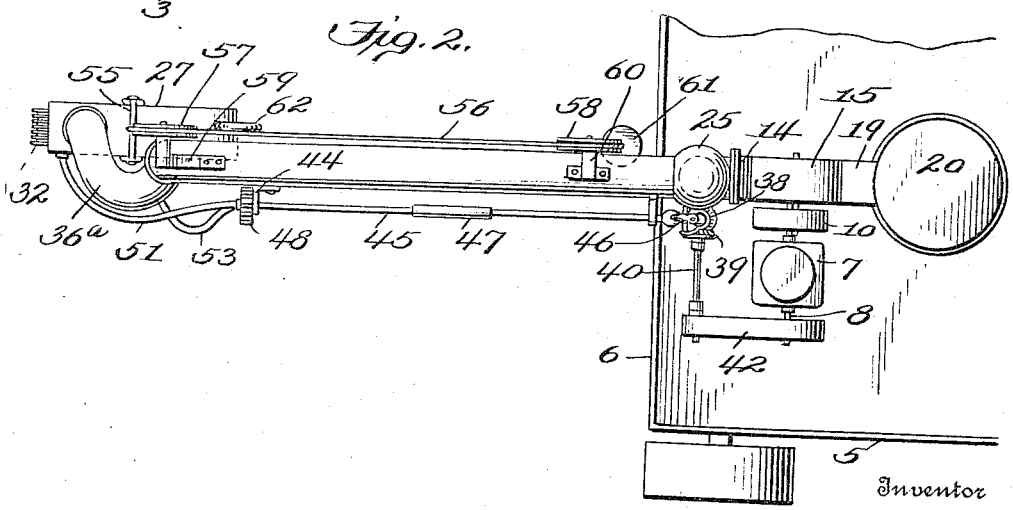

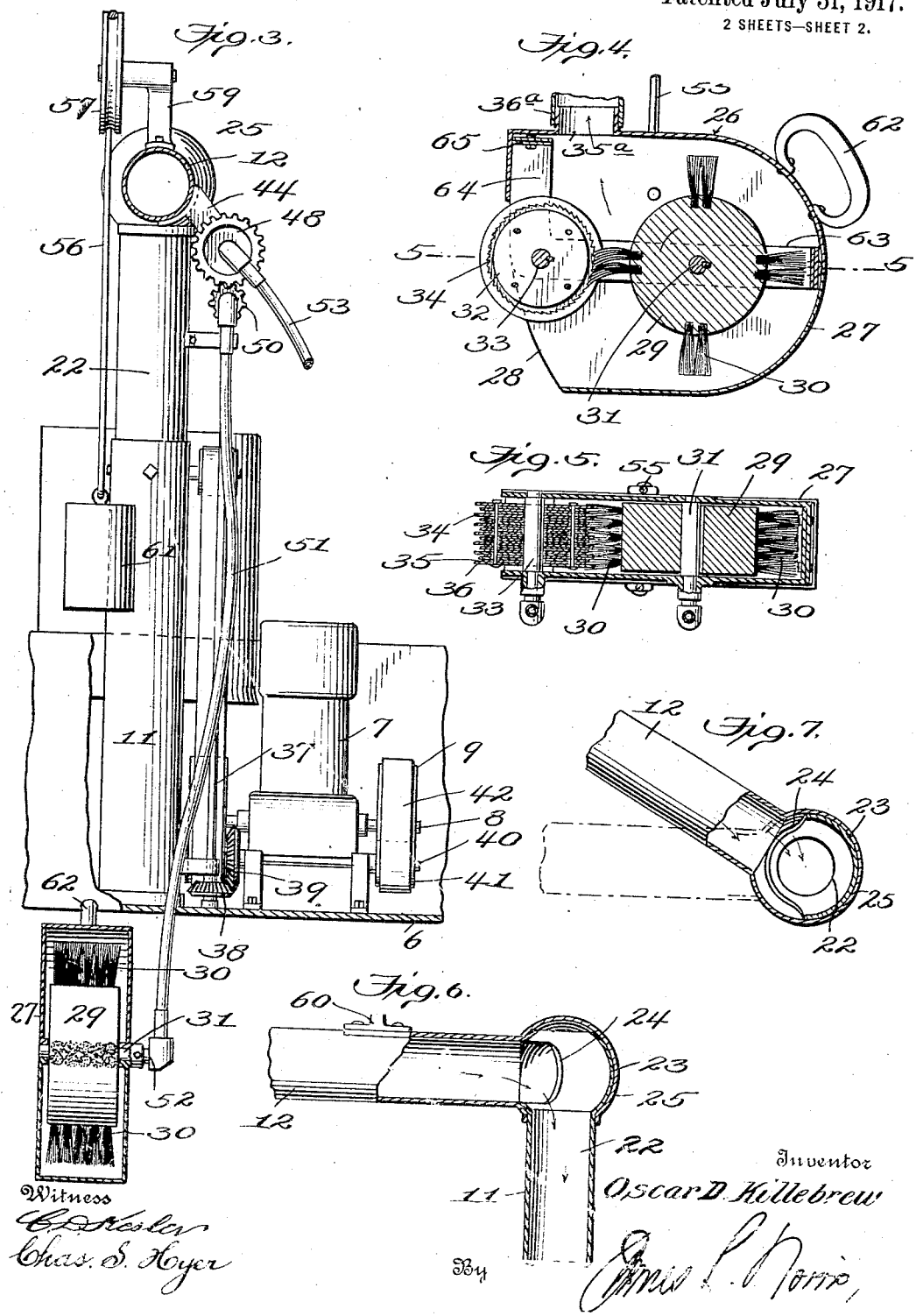
O. D. KILLEBREW.
COTTON PICKER.
APPLICATION FILED FEB. 23, 1917.
1,235,486.
Patented July 31, 1917.
2 SHEETS—SHEET 2.

OSCAR D. KILLEBREW, OF RICHMOND, VIRGINIA.

COTTON-PICKER.

1,235,486.   Specification of Letters Patent.   Patented July 31, 1917.

Application filed February 23, 1917. Serial No. 150,554.

*To all whom it may concern:*

Be it known that I, OSCAR D. KILLEBREW, a citizen of the United States, residing at Richmond, in the county of Henrico and State of Virginia, have invented new and useful Improvements in Cotton-Pickers, of which the following is a specification.

This invention relates to mechanical cotton pickers, and the primary object of the same is to provide a conveniently operable device for readily detaching the cotton fiber from the boll and transporting the separated cotton to a suitable receptacle, the improved device performing its functions without injury to growing plants or gathering trash or shells with the cotton. A further object of the invention is to provide a mechanical cotton picking device or apparatus which may be readily shifted from one position to another relatively to the growing cotton plants within a certain area and to gather the cotton with facility and materially less labor than is usually required in hand picking.

With these and other objects and advantages in view the invention consists in the construction and arrangement of parts hereinafter described and disclosing one practical form of embodiment of the invention and capable of variation, the essential features of the invention irrespective of any precise operating means or mounting being pointed out in the appended claims.

In the drawings:

Figure 1 is a side elevation of a cotton picker and coöperating support and actuating means partially broken away in section and embodying the features of the invention, the apparatus being shown applied to a wagon or other vehicle, the body of which is also shown in section.

Fig. 2 is a top plan view of the mechanism shown by Fig. 1.

Fig. 3 is a transverse vertical section taken in the plane of the line 3—3, Fig. 1.

Fig. 4 is a longitudinal vertical section of the picker.

Fig. 5 is a horizontal section taken in the plane of the line 5—5, Fig. 4.

Fig. 6 is a detail sectional elevation of a portion of the combined standard and cotton conduit having communication with the picker.

Fig. 7 is a top plan view of a portion of the combined standard or support and conduit broken away and in horizontal section in part and illustrated in two positions in full and dotted lines.

The numeral 5 designates a suitable wheeled vehicle which may be transported by any suitable means and comprising a body 6 in which a motor 7 is mounted at a suitable point and provided with a shaft 8 with pulleys 9 and 10 thereon. As illustrated in the drawings, a standard 11 is mounted in the body 6 adjacent to the motor and projects upwardly a suitable distance and has an arm 12 movably mounted on the upper end thereof to swing in a horizontal plane in opposite directions, the outer end of the arm 12 being curved downwardly as at 13. The standard 11 has the inlet 14 of a suction fan 15 secured thereto, the shaft 16 of this fan having a pulley 17 thereon engaged by a belt 18 which is also trained over the pulley 10 on the shaft 8. The outlet 19 of the fan 15 opens into the upper portion of a receiving chamber 20 which is fully open at the bottom, as at 21. The part of the standard 11 below the point of communication of the fan inlet 14 therewith is closed or interiorly occluded relatively to the upper portion of said standard, which is tubular as at 22, see Figs. 6 and 7; and on the upper end of this tubular portion of the standard is a hollow spherical head 23 with an opening 24 formed therein. The inner end of the arm 12 has an imperforate or closed spherical head 25 which is snugly fitted over the head 23 to form a hollow joint, the arm 12 being tubular throughout its full length and with the upper tubular portion 22 of the standard 11 forming a conduit or conveying means for the cotton which is picked or separated from the cotton bolls, suction being instituted in the said arm 12 and the hollow portion of the standard by the fan 15 through the actuation of the motor 7. The opening 24 in the spherical head 23 permits the arm 12 to be swung at extreme opposite points relatively to the body 6 of the vehicle without in the least interfering with the full communication of the said arm with the upper tubular portion 22 of the standard 11 through the connecting joint formed by the heads 23 and 25.

A picker 26 is provided and is preferably of the form shown by Figs. 1, 2, 3, 4 and 5, though it will be understood that the general contour as well as the proportions and dimensions thereof may be modified. This picker 26 is readily portable, and during the cotton harvesting or gathering operation an operator manipulates the picker relatively to the cotton bolls to remove the cotton from the latter by a very simple operation which is facilitated by the association of the picker with the arm 12 in a manner which will now be explained. The picker comprises an inclosing casing 27 with a front opening 28, the remaining part of the casing shielding the operating means therein and which consists of a brush cylinder 29 having brush tufts or bristles 30 secured thereto at intervals and mounted upon a shaft 31 having bearing in opposite sides of the casing and projecting at one side of the latter, as shown by Fig. 5. Adjacent to the brush cylinder 29 a saw cylinder 32 is mounted on a shaft 33 which also has bearing in the opposite sides of the casing 27 and one end of the shaft 33 is extended outwardly beyond one side of the casing in a manner similar to the shaft 31 of the brush cylinder 29. The saw cylinder consists of a plurality of saws 34 similar to the gin saws with space disks 35 between them and guard disks or shields 36 intermediately disposed relatively to the space disks. The saws 34 are of greater diameter than the space disks 35 and the guard disks 36 are of greater diameter than the saws, it being proposed to shield the teeth of the saws through the medium of the disks 36, which are preferably formed of metal and thereby prevent the saws from becoming injured by contact with any hard substance, such as stones or grit, and also to shield the branches and leaves of foliage of the cotton plants and prevent engagement of the latter with the saws. The cotton, however, from the bolls is brought into engagement with the saws between the disks 36. The saw cylinder comprising the parts just explained projects beyond or partially in advance of the picker casing 27 through the opening 28, the saws being exposed at the front and lower portions so as to be practicable in gathering cotton from bolls in various positions and enable an operator to push the picker over or apply said picker to the cotton bolls in the most effective manner to withdraw or release the cotton fiber therefrom. The brush cylinder 29 and the saw cylinder 32 rotate in the direction of the arrows, as shown by Fig. 4, and it will be seen that the saw teeth are directed downwardly and the brushing action of the bristles 30 is upwardly. The brush cylinder also rotates at a higher rate of speed than the saw cylinder, the ratio being about four to one, or the speed of rotation of the brush cylinder is four times as great as that of the saw cylinder in order to effectively release the cotton from the saw teeth and prevent clogging of the saws. Connected to the top of the casing 27 over an outlet opening 35ª is a flexible tube or pipe 36ª which is connected to the depending curved end 13 of the arm or crane 12, as clearly shown by Fig. 1, and the cotton as removed from the saw cylinder by the bristles 30 of the brush cylinder will be thrown upwardly, as indicated by the arrows in Fig. 4, and carried away by suction through the flexible pipe or elevating tube 36ª into the arm or crane 12 and through the joint between the latter and the upper end of the standard 11, and thence through the tubular portion 22 of said standard to the fan, whence it is driven into the chamber 20 where the air expands and its force reduced to such a degree as to permit the cotton to fall through the bottom opening 21 of said chamber into a suitable receptacle or bag that may be placed under the chamber.

A shaft 37 extends vertically with relation to the standard 11, and on the lower end thereof is a beveled pinion 38 which is held in continual mesh with a corresponding beveled pinion 39 on a power transmission shaft 40 provided with a pulley 41 which is engaged by a belt 42 running from the pulley 9 of the motor shaft 8. The shafts 37 and 40 will be held in suitable bearing devices, and in order to obtain the requisite speed of rotation it will be seen that the pulley 41 is of materially less diameter than the pulley 9. The arm 12 has a bearing 43 adjacent to the joint thereof with the standard 11, and near the outer curved end 13 of this arm is a depending bracket 44, a shaft 45 being mounted in the bearing 43 and bracket 44, and between the inner end of the shaft 45 and the upper end of the shaft 37 is a suitable universal joint or coupling 46 which will operate to insure the rotation of the shaft 45 in the same direction as the shaft 37. The universal coupling 46 as shown is but one form of connecting device or organization that may be adopted between the ends of the shafts 37 and 45 to insure a regular transmission of power and a similarity of rotation of the two shafts. This universal joint or analogous device between the ends of the shafts 37 and 45 is used to permit the arm 12 to swing in opposite directions without interfering with or checking the operation of the shafts, and to compensate for the difference in radius that will ensue when the arm 12 is swung at an angle it is proposed to make the shaft 45 in sections and telescopically associate the ends thereof, as at 47, and whereby the said shaft 45 may lengthen or shorten automatically in accordance with the movement of the arm 12. On the outer end of the shaft 45 is a gear 48, and below this gear is a stub shaft 49 held by the bracket 44 in a suitable bearing and provided with a pinion 50, the gear 48 being four times as great in diameter as the pinion 50 and whereby said pinion is caused to run four times as fast as the said gear. Between the shaft 45 and the projecting end of the shaft 33 of the saw cylinder a flexible shaft 51 is interposed, said flexible shaft being connected to the projecting end of the shaft 33 by a suitabl coupling 52 which may be applied or separated as desired. Between the stub shaft 49 and the projecting end of the shaft 31 of the brush cylinder 29 a flexible shaft 53 is interposed and the latter shaft is connected by a suitable coupling 54 to the projecting end of the shaft 31, the coupling permitting a ready attachment or detachment of the shaft 53. It will therefore be seen that the brush cylinder 29 is rotated at a much higher speed than the saw cylinder 32 for the purpose hereinbefore explained.

To facilitate the manipulation or application of the picker 26 a bail 55 is attached thereto, and to this bail is secured a cord or cable 56 which extends upwardly and engages grooved pulleys 57 and 58 held by upwardly projecting supports 59 and 60 secured on the upper portion of the arm 12, the inner end of the cord or cable 56 being provided with a counterpoise weight 61 which will relieve the operator of the dead weight of the picker 26 to a material extent. Through the medium of the counterpoise weight attachment for the picker as just described the picker may be readily elevated or depressed, and when elevated the counterpoise weight 61 descends and aids in the lifting operation and the work of the operator in applying the picker is thereby considerably lightened. To assist in the manipulation or application of the picker the latter has a handle or grip 62 secured thereto, as shown by Figs. 1 and 4. The casing 27 of the picker is made in separable parts and the upper part may be readily withdrawn from the lower portion for any purpose that may be found necessary. Within the casing 27 is a U-shaped frame 63 having upwardly projecting end members 64 connected at their upper terminals by a cross-member 65, as shown by Fig. 4. The details of construction and the exact arrangement of parts hereinbefore specified are not essential, the purpose of the illustration of said parts and the foregoing description of the same being to disclose one practical organization of elements to coöperate with the improved picker which embodies the essential features of the invention.

From the foregoing the operation of the improved apparatus will be readily understood. The picker 26 is applied to the cotton bolls and the cotton fiber is engaged by the saws 34 and carried around and cleared from the saws by the bristles 30 of the brush cylinder 29 and thrown upwardly toward the outlet opening 35$^a$ into the suction pipe or elevator 36$^a$, and from the latter passes through the arm 12 and the joint of the latter relatively to the standard or upright 11 and then downwardly through said standard or upright into the fan 15 and out into the chamber 20. During the operation of the picker the arm 12 may be readily swung in opposite directions to the best advantage in gathering cotton and to follow the rows of plants, the arm 12 allowing the manipulation of the picker within a considerable area on either side of the vehicle body 6. In the drawings and foregoing description only one picker 26 and appurtenances or coöperating parts therefor have been shown, but it will be understood that the same construction and arrangement of parts may be duplicated or a number of similar picker organizations may be mounted in one vehicle body and thereby increase the capacity of the picker and correspondingly facilitate the work of mechanical cotton picking over a large area of cotton plants adjacent to the body of the vehicle.

What is claimed as new is:

1. A cotton picker of the class specified comprising a casing with an opening at its front extremity, a saw cylinder mounted in the casing and exteriorly exposed through the said opening, the saw cylinder comprising a plurality of saws with guard means standing outwardly beyond the teeth thereof, means directly engaging the saws of the saw cylinder for removing cotton therefrom, and devices for continuously operating the saws and cotton removing means in one direction irrespective of the position of application of the picker and for receiving and conveying the cotton away from the saws.

2. A cotton picker comprising a casing with an opening at its front extremity, a saw cylinder mounted in the casing and exteriorly exposed through the said opening and comprising a plurality of saws having guard devices alternately arranged in relation thereto, the top of the casing having an outlet opening, a brush cylinder engaging the saws of the saw cylinder and operating to throw the cotton removed from the saws upwardly through the top outlet opening of the casing, tubular conveying means connected to the top of the casing over the outlet opening and having suction generating means coöperating therewith, and mechanism for continuously operating the saws and brush cylinder in one direction irrespective of the position of application of the picker.

3. A cotton picker mechanism comprising an upright tubular standard, a horizontal swinging tubular arm connected to the upper end of the said standard, a flexible tubular connection at the outer end of the said tubular arm, a picker casing having an opening at its front extremity, a saw cylinder mounted in the casing and exteriorly exposed through the said opening and comprising a plurality of saws with guard devices arranged in alternate relation thereto, the casing having a top outlet opening to which the flexible tubular connection is attached, a brush cylinder within the picker casing in engagement with the saws and operating to throw the cotton upwardly through the top outlet opening of the casing into the tubular connection, suction means coöperating with the standard, arm and tubular connection, and mechanism in part movable with the arm and picker casing and arranged to continuously operate the saws and brush cylinder in one direction irrespective of the position of application of the casing and the saw cylinder therein.

4. A cotton picker consisting of a casing with an opening therein, a saw cylinder embodying a plurality of saws exposed through the said opening, the saws being provided with guard means standing outwardly beyond the teeth thereof, a brush cylinder for removing the cotton from the saws, and means for operating the saw cylinder and brush cylinder and for conveying the cotton away from the picker.

5. A cotton picker comprising a casing having an opening therein, a saw cylinder mounted in the casing and embodying a plurality of saws exposed through said opening, the saws having guards in alternate relation thereto and forming part of the cylinder, the said guards standing outwardly beyond the saw teeth, a brush cylinder for removing the cotton from the saws, and means for operating the saw and brush cylinders and conveying the cotton away from the saws.

6. A cotton picker embodying a casing, a saw cylinder continuously rotatable in one direction and in part exposed through the casing and comprising a plurality of saws having guards alternately arranged in relation thereto and rotatable with the saws, means for engaging and releasing the cotton from the saws, and mechanism for operating the saw cylinder and the said releasing means.

In testimony whereof I have hereunto set my hand in presence of two subscribing witnesses.

OSCAR D. KILLEBREW.

Witnesses:
  ROY T. SUNDAY,
  J. FLOYD BATES.